US009253678B2

(12) United States Patent
Keskitalo et al.

(10) Patent No.: US 9,253,678 B2
(45) Date of Patent: Feb. 2, 2016

(54) METHOD AND APPARATUS FOR PROVIDING MEASUREMENT REPORTING TO REDUCE DRIVE TESTING REQUIREMENTS

(75) Inventors: Ilkka Keskitalo, Oulu (FI); Jarkko Tuomo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 106 days.

(21) Appl. No.: 13/876,347

(22) PCT Filed: Sep. 29, 2011

(86) PCT No.: PCT/FI2011/050841
§ 371 (c)(1),
(2), (4) Date: Mar. 27, 2013

(87) PCT Pub. No.: WO2012/042114
PCT Pub. Date: Apr. 5, 2012

(65) Prior Publication Data
US 2013/0183978 A1 Jul. 18, 2013

Related U.S. Application Data

(60) Provisional application No. 61/388,877, filed on Oct. 1, 2010.

(51) Int. Cl.
*H04W 36/00* (2009.01)
*H04W 24/10* (2009.01)
(Continued)

(52) U.S. Cl.
CPC .............. *H04W 24/10* (2013.01); *H04W 24/08* (2013.01); *H04W 36/14* (2013.01)

(58) Field of Classification Search
CPC .......................... H04W 88/06; H04W 36/0066
USPC ................................... 455/436–444
See application file for complete search history.

(56) References Cited

U.S. PATENT DOCUMENTS

2009/0191862 A1   7/2009  Amirijoo et al.
2010/0190488 A1*  7/2010  Jung et al. ............... 455/424
(Continued)

FOREIGN PATENT DOCUMENTS

CN       101521901 A       9/2009
WO       2010087625        8/2010

OTHER PUBLICATIONS

3GPP TSG-RAN WG2 Meeting #69bis,Idle mode MDT reporting mechanism, Apr. 12-16, 2010, 3GPP.*
(Continued)

*Primary Examiner* — Wayne Cai
*Assistant Examiner* — Said Elnoubi
(74) *Attorney, Agent, or Firm* — Alston & Bird LLP

(57) ABSTRACT

A method, apparatus and computer program product are provided that may provide a scheme for measurement reporting for minimization of drive tests (MDT) data. In the context of a method, an indication of a handover of a user terminal from a first cell associated with a first public land mobile network (PLMN) to a second cell associated with a second PLMN may be received by the user terminal. Responsive to the handover, an indication of availability of MDT measurement logged data may be provided to the second PLMN. A determination may then be made at the user terminal as to whether to provide the MDT measurement logged data to the second PLMN based on an identity of the second PLMN.

16 Claims, 6 Drawing Sheets

(51) Int. Cl.
*H04W 24/08* (2009.01)
*H04W 36/14* (2009.01)

(56) References Cited

U.S. PATENT DOCUMENTS

| | | | |
|---|---|---|---|
| 2010/0269069 A1* | 10/2010 | Paila et al. | 715/835 |
| 2011/0003594 A1* | 1/2011 | Cooper | 455/436 |
| 2011/0183662 A1* | 7/2011 | Lee et al. | 455/422.1 |
| 2011/0195668 A1 | 8/2011 | Lee et al. | |
| 2011/0276838 A1* | 11/2011 | Zhou et al. | 714/45 |
| 2012/0164979 A1* | 6/2012 | Bachmann et al. | 455/411 |

OTHER PUBLICATIONS

3GPP TSG-RAN WG2 Meeting #69bis, Idle mode MDT reporting mechanism, Apr. 12-16, 2010.*

International Search Report and Written Opinion received for corresponding Patent Cooperation Treaty Application No. PCT/FI2011/050841, dated Jan. 19, 2012, 11 pages.

'MDT considerations', 3GPP Draft R2-101519, 3rd Generation Partnership project (3GPP), 3GPP TSG-RAN WG2 Meeting #68bis, San Francisco, USA, Feb. 22-26, 2010, pp. 9 [online] EPOQUENET NPL, XP050450908, Feb. 17, 2010.

'Idle mode logged MDT reporting mechanism', 3GPP Draft, R2-102056, 3rd Generation Partnership Project (3GPP), 3GPP TSG-RAN WG2 Meeting #69bis, Beijing, China, Apr. 12-16, 2010, pp. 4 [online] EPOQUENET NPL, XP050422365, Apr. 4, 2010.

Office Action for Chinese Application No. 201180056351.9 dated Jun. 5, 2015.

3GPP TSG RAN WG2 Meeting #70, CATT, *Handling of the Log Available Indication*, R2-102793, (May 10-14, 2010) 2 pages.

* cited by examiner

US 9,253,678 B2

METHOD AND APPARATUS FOR PROVIDING MEASUREMENT REPORTING TO REDUCE DRIVE TESTING REQUIREMENTS

RELATED APPLICATION

This application was originally filed as PCT Application No PCT/FI2011/050841 filed Sep. 29, 2011.

TECHNOLOGICAL FIELD

Embodiments of the present invention relate generally to wireless communication technology and, more particularly, relate to an apparatus, method and a computer program product for providing a measurement reporting scheme for employment to reduce the need for drive testing.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. By providing access to users while enabling user mobility, services may be provided to users while the users remain mobile. However, the mobility of users requires the network to provide continuity of service to the mobile users by enabling a user's mobile terminal to be handed over between different serving stations within corresponding different cells or service areas. To verify and test radio network deployment and operation, drive tests had been conducted in the past. Drive testing typically involved the use of specific measurement tools that could be driven through an area to collect data for network operation verification. Thus, manual testing and verification of radio network operation has been common.

For existing and especially for newer networks (e.g., LTE and future networks), it may be desirable to reduce the need for drive testing to reduce manual testing of networks and therefore reduce operational costs. Accordingly, studies regarding support for minimization of drive tests (MDT) are currently popular which aim to utilize commercial terminals for reporting of relevant measurement results in order to avoid separate manual testing with special test equipment and involvement of operator personnel.

BRIEF SUMMARY

A method, apparatus and computer program product are therefore provided that may provide a scheme for measurement reporting for MDT. The measurement reporting may be used in connection with MDT so that reporting used in connection with MDT may be conducted in a manner that may reduce the need for drive testing while also ensuring that logged MDT data stored at a user terminal is not reported to a different PLMN than that which configured the UE for reporting (or its equivalent PLMNs).

BRIEF DESCRIPTION OF THE DRAWING(S)

Having thus described the embodiments in general terms, reference will now be made to the accompanying drawings, which are not necessarily drawn to scale, and wherein:

DETAILED DESCRIPTION

Figure 1:
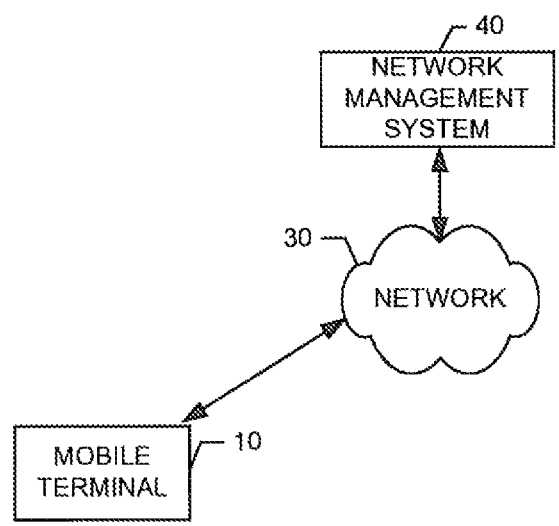
FIG. 1 is a schematic block diagram of a wireless communications system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the management of measurement reporting responsive to a cell change between different PLMNs. In this regard, for example, for a mobile terminal that is directed to provide or is currently logging measurement information (e.g., for MDT) when a handover occurs between different PLMNs for any reason, some embodiments of the present invention may enable the provision of instructions for handling such a situation. MDT measurement reporting is typically done via radio resource control (RRC) signaling. For a mobile terminal that is in an active or connected mode, the reporting can be either immediate, corresponding to normal reporting principles for radio resource management purposes, or may be delayed such that, for example, reporting is delayed until a particular event trigger initiates a stored report to be sent (e.g., when in idle mode, reports may be stored and sent when a connection is set up in the future). The measurements reported may include data gathered by the mobile terminal as the mobile terminal moves throughout one or more cells for use in assessing network coverage or capacity, optimizing mobility parameters and other coverage or capacity related performance criteria. Accordingly, as referred to herein, MDT reports (or measurement reports) should be understood to correspond to any reports that may be provided from a mobile terminal to network devices to assist the network in managing or at least becoming aware of network coverage and capacity characteristics experienced at various locations in the network at which reporting devices are positioned.

FIG. 1 illustrates a generic system diagram in which a device such as a mobile terminal 10, which may benefit from embodiments of the present invention, is shown in an example communication environment. As shown in FIG. 1, a system in accordance with an example embodiment of the present invention includes a communication device (e.g., mobile terminal 10) that may be capable of communication with a network 30. The mobile terminal 10 may be an example of one of several communications devices of the system that may be able to communicate with network devices or with each other via the network 30. In some cases, various aspects of operation of the network 30 may be managed by one or more network devices. As an example, the network 30 may include a network management system 40, which may be involved with (perhaps among other things) performing network management functions.

While several embodiments of the mobile terminal 10 may be illustrated and hereinafter described for purposes of example, other types of mobile terminals, such as portable digital assistants (PDAs), pagers, mobile televisions, mobile telephones, gaming devices, laptop computers, cameras, camera phones, video recorders, audio/video player, radio, GPS devices, navigation devices, or any combination of the aforementioned, and other types of voice and text communications systems, can readily employ embodiments of the present invention.

In an example embodiment, the network 30 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and other communication devices may be capable of communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the other communication devices via the network 30. By directly or indirectly connecting the mobile terminal 10 and the other communication devices to the network 30, the mobile terminal 10 and the other communication devices may be enabled to communicate with network devices and/or each other, for example, according to numerous communication protocols including Hypertext Transfer Protocol (HTTP) and/or the like, to thereby carry out various communication or other functions of the mobile terminal 10 and the other communication devices, respectively.

Furthermore, although not shown in FIG. 1, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 30 and other devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the network management system 40 may be a device, node or collection of devices and nodes such as a server, computer or other network device. The network management system 40 may have any number of functions or associations with various services. As such, for example, the network management system 40 may be a platform such as a dedicated server (or server bank) associated with a particular information source or service (e.g., network management services), or the network management system 40 may be a backend server associated with one or more other functions or services. As such, the network management system 40 represents a potential host for a plurality of different network management services. In some embodiments, the functionality of the network management system 40 is provided by hardware and/or software components configured to operate in accordance with known techniques for the provision of network management services to the network 30. However, at least some of the functionality provided by the network management system 40 may be provided in accordance with example embodiments of the present invention.

Figure 2:
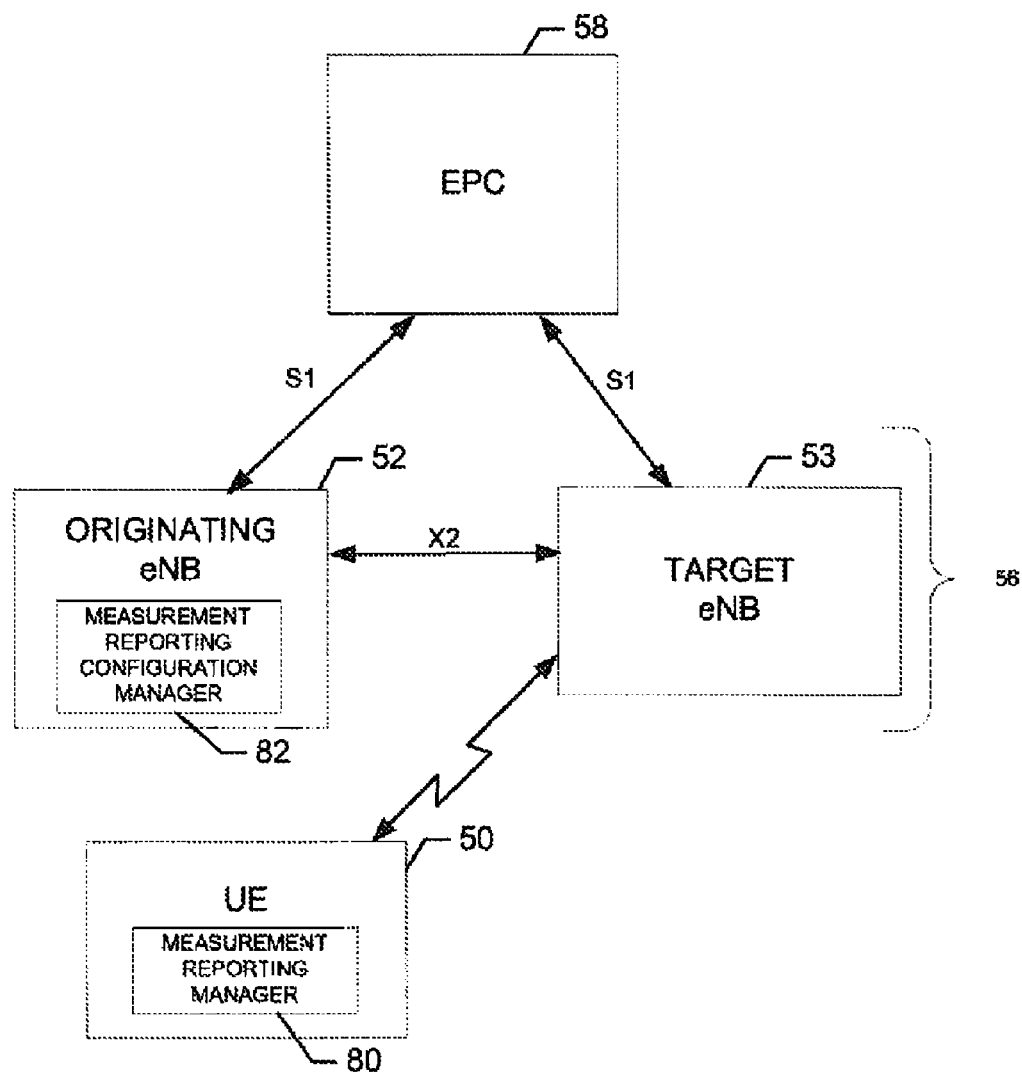
FIG. 2 is a schematic diagram showing a system for providing management of measurement reporting according to an example embodiment of the present invention.

An example embodiment of the invention will now be described with reference to FIG. 2, in which certain elements of a system for providing management of measurement reporting after cell change are displayed. The system of FIG. 2 represents a specific embodiment of a network such as the general network displayed in FIG. 1, except that FIG. 2 represents a general block diagram of an E-UTRAN. As such, in connection with FIG. 2, user equipment (UE) 50 may be an example of one embodiment of the mobile terminal 10 of FIG. 1 and eNBs (E-UTRAN node Bs) 52 and 53 may be examples of base stations or access points that may serve respective cells or areas within the network 30 to, together with other eNBs, define the coverage provided by the network 30 to mobile users. However, it should be noted that the system of FIG. 2, may also be employed in connection with a variety of other devices, both mobile and fixed, and therefore, embodiments of the present invention should not be limited to application on devices such as the mobile terminal 10 of FIG. 1 or the network devices of FIG. 2. Moreover FIG. 2, which illustrates E-UTRAN components, should be understood to be just an example of one type of network with which embodiments of the present invention may be employed.

Referring now to FIG. 2, the system includes an E-UTRAN 56 which may include, among other things, a plurality of node-Bs in communication with an evolved packet core (EPC) 58 which may include one or more mobility management entities (MMEs) and one or more system architecture evolution (SAE) gateways. The node-Bs may be E-UTRAN node-Bs (e.g., eNBs such as originating eNB 52 and target eNB 53) and may also be in communication with the UE 50 and other UEs. The E-UTRAN 56 may be in communication with the EPC 58. In an example embodiment, the network management system 40 of FIG. 1 may be an example of a device or collection of devices within the EPC 58 that may be configured to employ an example embodiment of the present invention. In some embodiments, instances of a measurement continuity manager 80 may be present at each of the eNBs 52 and 53 to control continuity of measurements associated with MDT as described in greater detail below. However, it should be appreciated that in some embodiments, rather than employing instances of the measurement continuity manager 80 at each respective eNB, the EPC 58 may employ an instance of the measurement continuity manager 80 and direct operations of the eNBs accordingly.

The eNBs 52 and 53 may provide E-UTRA user plane and control plane (radio resource control (RRC)) protocol terminations for the UE 50. The eNBs 52 and 53 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS (Evolved Packet System) bearer control, ciphering and integrity protection of (non access stratum) NAS signaling, and the like. The SAE gateway may host functions such as termination and switching of certain packets for paging and support of UE mobility. In an example embodiment, the EPC 58 may provide connection to a network such as the Internet. As shown in FIG. 2, the eNBs 52 and 53 may each include a measurement continuity manager 80 configured to execute functions associated with each corresponding eNB with respect to receiving information from and/or providing information to the UE 50, the EPC 58 and/or other eNBs related to, for example, communication format parameters and/or measurement parameters related to MDT.

In some embodiments, the system of FIG. 2 may include one or more public land mobile networks (PLMNs) coupled to one or more other data or communication networks—notably a wide area network (WAN) such as the Internet. Each of the PLMNs may include a core network backbone such as the EPC 58. Each of the core networks and the Internet may be coupled to one or more radio access networks, air interfaces or the like that implement one or more radio access technologies. The radio access networks may each include one or more base stations (e.g., eNBs 52 or 53), access points or the like, each of which may serve a coverage area divided into one or more cells. In some cases, eNBs 52 and 53 may be associated with the same PLMN or equivalent PLMNs. In such cases, any MDT measurement reporting provided to either eNB may still be useful to the corresponding PLMN. However, in a situation where a handover occurs between access points or base stations that are associated with different PLMNs, it may not be desirable for MDT measurements that are made or logged for one PLMN to be provided to the other and different PLMN. This situation may be referred to as a cell change between different PLMNs.

In situations where idle mode logging and reporting of MDT measurements are to be provided, the serving network typically configures MDT measurement logging for a selected UE (e.g., UE 50) during an active connection. Thus, when the UE 50 goes into the idle state, the UE 50 may begin MDT measurement logging. Other triggers may also be employed to initiate MDT measurement logging according to configuration provided by the network. Generally, the UE 50 may stop logging if a duration specified by the configuration is reached or if the memory space utilized for logging (i.e., the log) is full. Otherwise, logging may continue while the UE 50 is roaming and is in a "camped normally" state. In some cases, the log may be cleared when the PLMN is changed (e.g., when a cell change occurs to a PLMN that is outside the list of equivalent PLMNs). When the UE 50 enters the connected state from the idle state where logging has occurred, the UE 50 may indicate (repeatedly in some instances) the availability of the MDT measurement logged data via messages such as, for example, RRCConnectionSetupComplete, RRCConnectionReestablishmentComplete, RRCConnectionReconfigurationComplete, and/or the like. When receiving the indication of the availability of the MDT measurement logged data, the network may at any suitable time request that the UE provide the MDT measurement logged data to the network. After providing the MDT measurement logged data to the network, the UE 50 may be enabled to clear the log.

A report of MDT measurement logged data after a cell change between different PLMNs may need some form of handling to prevent the UE 50 from reporting the MDT measurement logged data to a different PLMN. In some situations, there may be a delay after a handover of the UE 50 between two eNBs (e.g., between eNB 52 and eNB 53) before the UE 50 receives information identifying the PLMN associated with the eNB to which the handover was conducted. Thus, for example, if the originating eNB 52 is associated with a first PLMN that directed the UE 50 to record MDT measurements and the target eNB 53 is associated with a second and different PLMN, it may take some time before the UE 50 is aware that the target eNB 53 is associated with the second PLMN. Thus, the UE 50 could otherwise include a log indication in one of the messages listed above (e.g., the RRC-ConnectionReconfigurationComplete after the handover is successfully completed). The log indication may inform the second PLMN that the UE 50 has MDT measurement logged data (although it is data logged for a different PLMN, namely the first PLMN) and may request that the UE 50 report the MDT measurement logged data. In this regard, the identity of the second PLMN is typically not signaled during handover execution, but can be read from the system information broadcasted by the target cell. The reading of the system information to determine the identity of the second PLMN may take several hundreds of milliseconds in some cases and this delay may be too late for the UE 50 to determine whether to send the report to the second PLMN. The UE 50 often has information available to it (e.g., in the access stratum layer) to indicate the equivalent PLMNs identifiers corresponding to the identifier of the PLMN that configured the UE 50 for MDT measurement reporting. However, there may be situations where the UE 50 may not know the PLMN when a MDT configuration is received such as, for example, when the UE has performed a handover to a cell that configures the MDT after which it possibly moves forward in the network before reading the system information and thus getting the PLMN of the configuring cell. Some example embodiments of the present invention may therefore attempt to ensure that the UE 50 receives the PLMN identification of the second PLMN in time to determine whether to report to the second PLMN if a request for a report is received after handover. Some embodiments may alternatively or additionally attempt to ensure that the network (e.g., the first PLMN) directs clearance of the log before the UE 50 enters the second PLMN.

Figure 3:
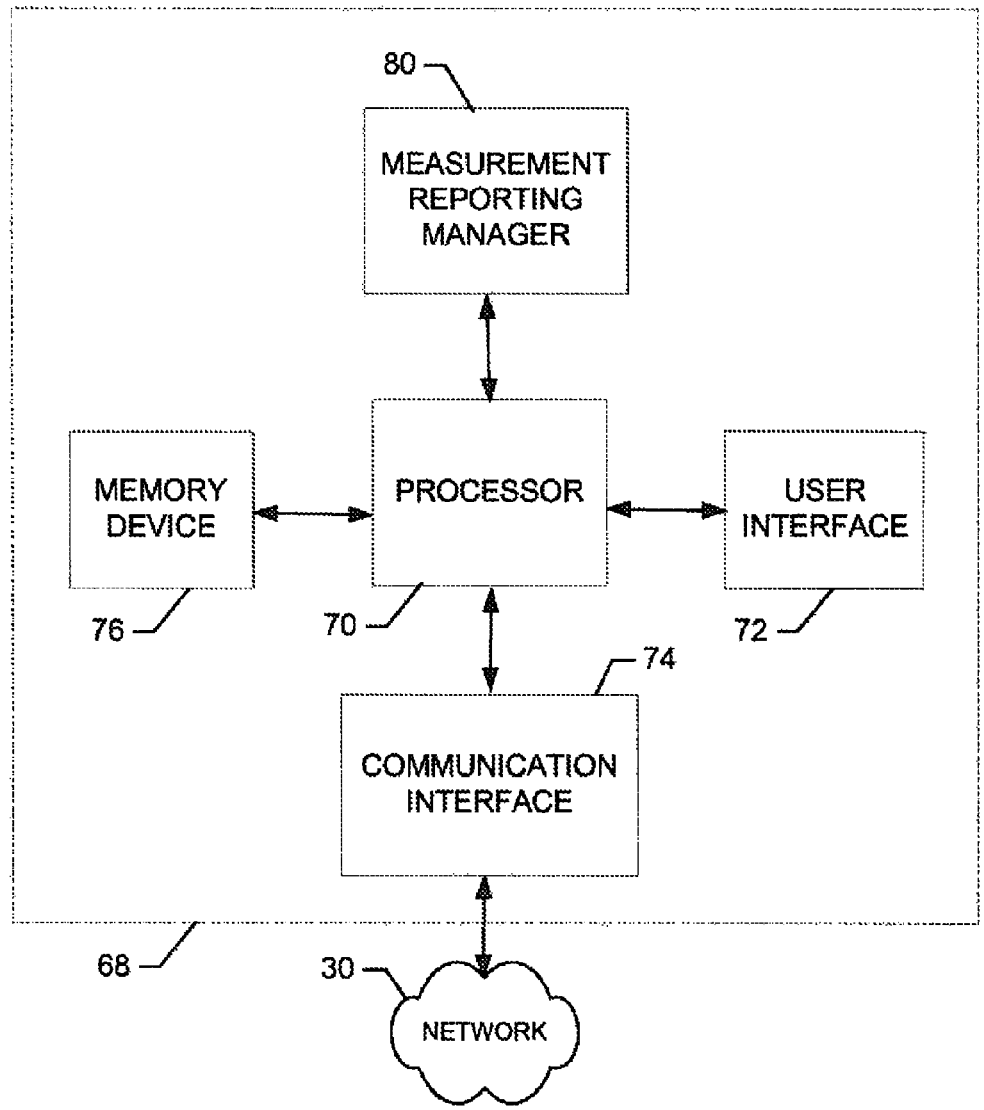
FIG. 3 is a block diagram of an apparatus for providing management of measurement reporting in a user terminal according to an example embodiment of the present invention.
Figure 4:
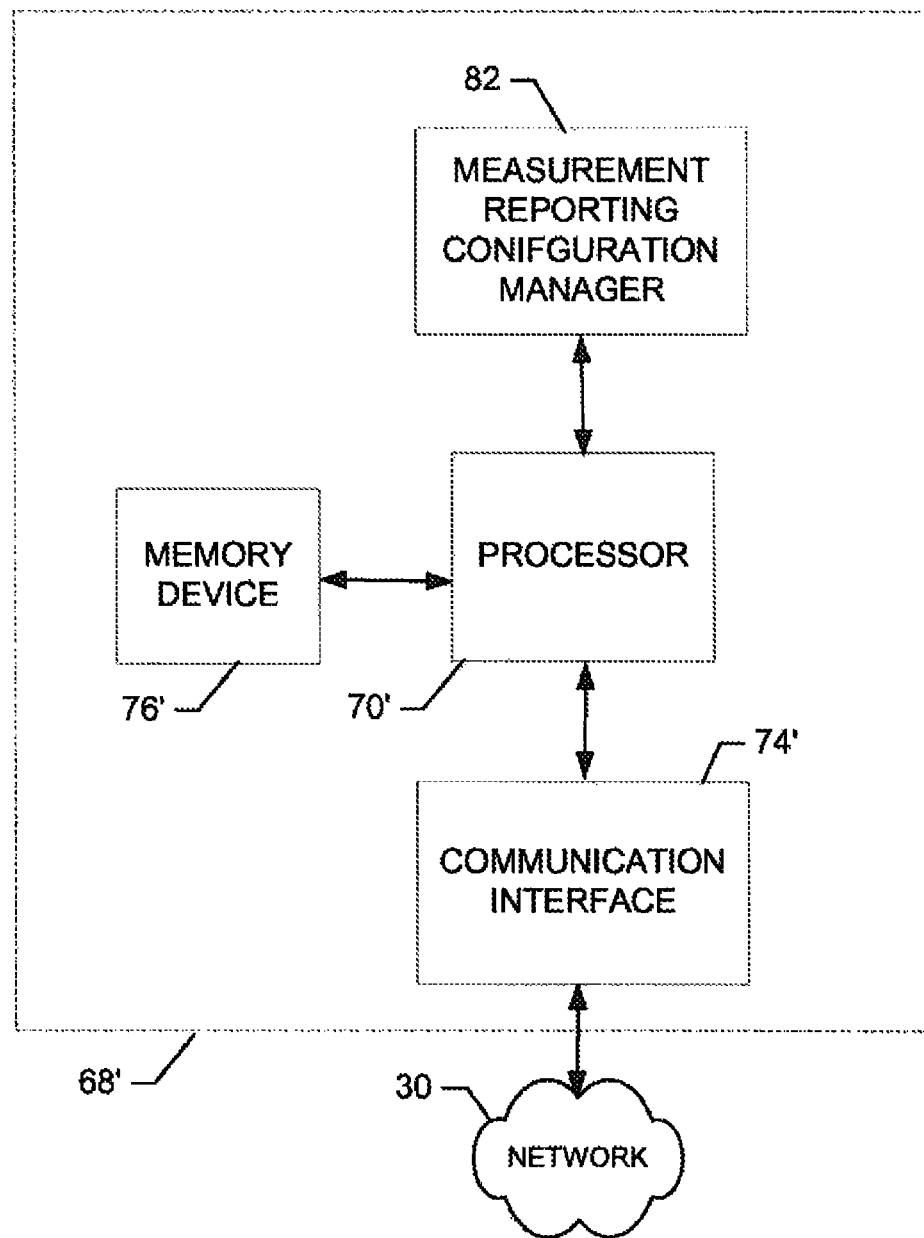
FIG. 4 is a block diagram of an apparatus embodied at a network device for providing management of measurement reporting according to an example embodiment of the present invention.

FIGS. 3 and 4 illustrate block diagrams of apparatuses for providing management of measurement reporting responsive to a cell change between different PLMNs. The apparatus of FIG. 3 may be employed, for example, on the mobile terminal 10. Meanwhile, the apparatus of FIG. 4 may be employed, for example, on the network management system 40 or on the eNBs 52 and 53. However, the apparatus may alternatively be embodied at a variety of other devices. In some cases, embodiments may be employed on either one or a combination of devices. Furthermore, it should be noted that the devices or elements described below may not be mandatory and thus some may be omitted in certain embodiments.

Referring now to FIG. 3, an apparatus 68 for providing management of measurement reporting responsive to a cell change between different PLMNs is provided. The apparatus 68 may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 68. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 68 may, in some embodiments, be a mobile terminal (e.g., mobile terminal 10) or a fixed communication device or computing device configured to employ an example embodiment of the present invention. However, in some embodiments, the apparatus 68 may be embodied as a chip or chip set. In other words, the apparatus 68 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 68 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control the measurement reporting manager 80. As such, in some embodiments, the processor 70 may be said to cause, direct or control the execution or occurrence of the various functions attributed to the measurement reporting manager 80 as described herein. The measurement reporting manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the measurement reporting manager 80 as described herein. Thus, in examples in which software is employed, a device or circuitry (e.g., the processor 70 in one example) executing the software forms the structure associated with such means.

The measurement reporting manager 80 may be configured to handle the instructions provided to the UE 50 with respect to maintaining continuity of measurement reports (e.g., MDT measurement logged data) responsive to a cell handover. In some embodiments, the measurement reporting manager 80 may be configured to receive information indicative of the identity of the second PLMN (e.g., the PLMN of the target eNB 53). The information indicative of the identity of the second PLMN may be either an indication of the PLMN requesting MDT measurement logged data or an indication of the PLMN to which the handover is to be conducted (e.g., the second PLMN in this example). The measurement reporting manager 80 may be configured to check the identity of the second PLMN (e.g., either the identity of the PLMN requesting the logged data or the identity of the PLMN to which the handover is to be conducted) prior to sending the MDT measurement logged data. In some examples, the measurement reporting manager 80 may be configured to delete the MDT measurement logged data (e.g., delete the entire contents of the log) if the second PLMN is different than the first PLMN or not an equivalent PLMN. In some examples, the measurement reporting manager 80 may be configured to refrain from responding to a request for the MDT measurement logged data if the request is sent by a PLMN that is different than (including not equivalent to) the original or first PLMN.

In examples where the measurement reporting manager 80 deletes the log rather than simply not responding, the deletion of the MDT measurement logged data from the log may occur before or after the actual handover. In some embodiments, the UE 50 may delay answering request for MDT measurement logged data either indefinitely (in the case where the measurement reporting manager 80 is configured not to respond to requests associated with a different PLMN) or for a period of time sufficient to enable the measurement reporting manager 80 to determine the identity of the requesting PLMN.

In some example embodiments, the measurement reporting manager 80 may respond to instructions from the network (e.g., from the apparatus 68' described in greater detail below) in order to delete the MDT measurement logged data in the log. In this regard, in some embodiments, the network may determine that it is undesirable for the MDT measurement logged data to be available for provision to a different PLMN. Thus, the network may delete the MDT configuration of the measurement reporting manager 80 (which may result in deletion of the MDT measurement logged data currently in the log) or may otherwise direct deletion of the MDT measurement logged data prior to conducting a handover between cells.

In some embodiments, the measurement reporting manager 80 may store or otherwise be aware of an identity of the first PLMN (and equivalents) so that the measurement reporting manager 80 may determine whether the identity of the PLMN requesting the MDT measurement logged data or the identity of the PLMN to which the handover is to be conducted corresponds to the identity of the first PLMN (e.g., the PLMN that configured the UE 50 for measurement reporting) or its equivalents. In some cases, the measurement reporting manager 80 may be configured to store (e.g., in the memory device 76) one or more PLMN identifiers (e.g., of the first PLMN and equivalent PLMNs) of PLMNs where the configuration defining measurement reporting policies is valid. Alternatively or additionally, the measurement reporting manager 80 may be configured to autonomously derive the identities of valid PLMNs by knowing the selected PLMN while the UE 50 is in a connected mode. Rules and/or procedures may be defined for interaction between non access stratum and access stratum, or for delaying configuration of the measurement reporting manager 80 until the identity of the selected PLMN in the connected mode is determined. Delays may be relatively long in some cases and may involve TAU procedure and SIB (system information block) reading.

The measurement reporting manager 80 may therefore be configured with rules defining specific conditions and/or situations that enable or prompt the UE 50 to provide the MDT measurement logged data to a requesting entity. In an example embodiment, the configuration of the measurement reporting manager 80 may be provided by a network entity (e.g., the apparatus 68' of FIG. 4) to provide the UE 50 with instructions regarding how to determine identities of the selected PLMN, the PLMN requesting a report of MDT measurement logged data and/or the PLMN to which a handover is to be conducted.

As indicated above, FIG. 4 illustrates a block diagram of an apparatus 68' for providing management of measurement reporting responsive to a cell change between different PLMNs from the perspective of a network entity. The apparatus 68' may include several basic components similar to those of the apparatus 68 of FIG. 3. In this regard, for example, the apparatus 68' may include components such as a processor 70', a memory device 76' and a communication interface 74' as shown in the example of FIG. 4. The processor 70', the memory device 76' and the communication interface 74' may have similar structural characteristics and functional capabilities to the processor 70, memory device 76 and communication interface 74 of FIG. 3 except perhaps as to scale and semantic differences. Accordingly, a detailed description of these components will not be provided.

In an example embodiment, the apparatus 68' may further include a measurement reporting configuration manager 82. In some cases, the processor 70' may be embodied as, include or otherwise control the measurement reporting configuration manager 82. As such, in some embodiments, the processor 70' may be said to cause, direct or control the execution or occurrence of the various functions attributed to the measurement reporting configuration manager 82 as described herein. The measurement reporting configuration manager 82 may be any means such as a device or circuitry operating in accordance with software or otherwise embodied in hardware or a combination of hardware and software (e.g., processor 70' operating under software control, the processor 70' embodied as an ASIC or FPGA specifically configured to perform the operations described herein, or a combination thereof) thereby configuring the device or circuitry to perform the corresponding functions of the measurement reporting configuration manager 82 as described herein. Thus, in examples in which software is employed, a device or circuitry (e.g., the processor 70' in one example) executing the software forms the structure associated with such means.

The measurement reporting configuration manager 82 may be configured to provide instructions to the UE 50 (e.g., to the measurement reporting manager 80) with respect to maintaining continuity of measurement reports (e.g., MDT measurement logged data) responsive to a cell handover. In some embodiments, the measurement reporting configuration manager 82 may be configured to provide configuration information to the measurement reporting manager 80 to define rules identifying the conditions under which the measurement reporting manager 80 is permitted or directed to report MDT measurement logged data. In some embodiments, the measurement reporting configuration manager 82 may be configured to configure the measurement reporting manager 80 with instructions as to how to determine either or both of the identity of the first PLMN and the second PLMN to make determinations relative to other rules. For example, the other rules may indicate that the measurement reporting manager 80 is to delete the log responsive to a handover to the second PLMN when the second PLMN is a different PLMN than the first PLMN or its equivalent PLMNs. The other rules may also or alternatively direct the measurement reporting manager 80 is to delay or otherwise avoid reporting of MDT measurement logged data responsive to a handover to the second PLMN when the second PLMN is a different PLMN than the first PLMN or its equivalent PLMNs. Having provided these rules, the measurement reporting manager 80 may then be configured to autonomously operate to avoid reporting of MDT measurement logged data to the second PLMN when the second PLMN is a different PLMN than the first PLMN or its equivalent PLMNs. However, in an example embodiment, the measurement reporting configuration manager 82 may be configured to determine the identity of the second PLMN in a handover to see if the second PLMN is an equivalent PLMN (to the first PLMN (selected PLMN) if it is assumed that the first PLMN configured the UE 50 for measurement reporting or to equivalent to the PLMN that configured the UE 50 in instances where the first PLMN is merely an equivalent of the PLMN that configured the UE 50). The measurement reporting configuration manager 82 may then direct the measurement reporting manager 80 to delete the MDT measurement logged data responsive to handover (e.g., either before handover or after handover) of the UE 50 to the second PLMN.

In some embodiments, if the UE 50 does not become aware of the identity of the first PLMN when the measurement reporting configuration is provided, an MDT configuration message may be provided by the measurement reporting configuration manager 82 to provide a list of allowable PLMN identifiers where the measurement reporting configuration is valid and therefore where reporting of the MDT measurement logged data may be performed. In some embodiments, the list of allowable PLMN identifiers may be the same as the list of equivalent PLMNs to the first PLMN. However, in other examples, the list of allowable PLMNs may be different (either being larger or smaller or having a different combination of PLMNs).

Figure 5:
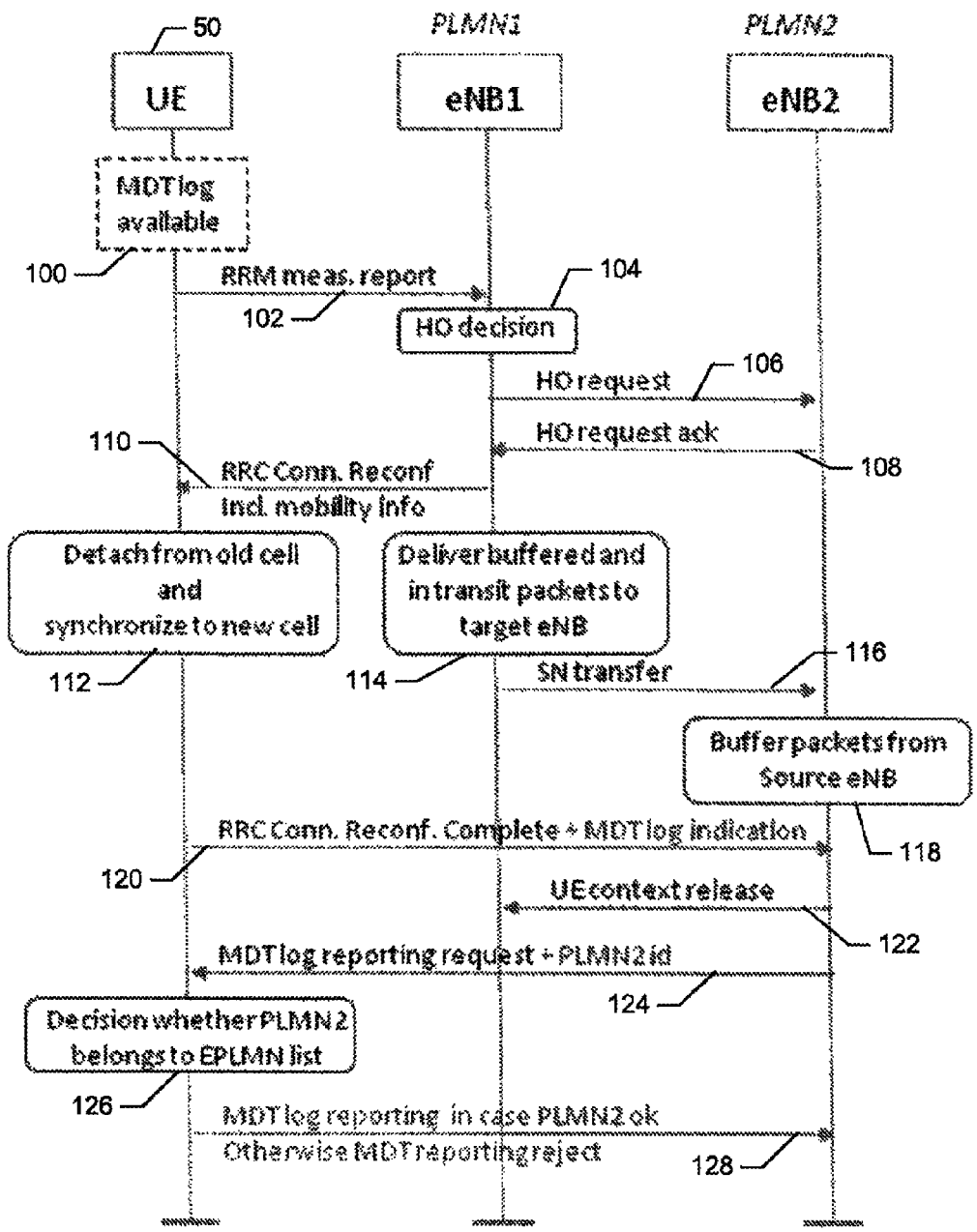
FIG. 5 is a control flow diagram illustrating a mechanism for providing management of measurement reporting according to an example embodiment of the present invention.

FIG. 5 illustrates a control flow diagram showing an example of signaling that may be exchanged in the performance of one example embodiment. As shown in FIG. 5, the UE 50 may initially be in communication with a first eNB (e.g., eNB1) that is associated with a first PLMN (e.g., PLMN1). The UE 50 may already be configured by eNB1 to provide measurement reports to eNB1. Thus, the MDT log 100 may already be available to provide measurement reports as indicated at operation 102. At operation 104, a handover decision may be made (for any reason) to handover the UE 50 to a second eNB (e.g., eNB2) that is associated with a second PLMN (e.g., PLMN2).

Responsive to the handover decision, eNB1 may provide a handover request to eNB2 at operation 106. The handover request may then be acknowledged at operation 108. An RRC message including mobility information (e.g., RRCConnectionReconfiguration) may then be provided to the UE 50 at operation 110. The UE 50 may then detach from the originating cell and synchronize to the target cell at operation 112. Buffered and in transit packets may then be transferred to the target eNB as shown at operations 114 and 116. Packets received from the originating or source eNB (e.g., eNB1) may then be buffered by eNB2 as needed at operation 118. At operation 120, the UE 50 may send an RRCConnectionReconfigurationComplete message to the eNB2, which may include an indication of the availability of MDT measurement logged data. A UE context release may be provided from eNB2 to eNB1 at operation 122 and then eNB2 may request the MDT measurement logged data as indicated at operation 124. The UE 50 may then determine whether PLMN2 belongs to a list of allowable PLMNs (or is an equivalent PLMN to the PLMN that configured the UE for measurement reporting) at operation 126. The UE 50 may provide the MDT measurement logged data to eNB2 if PLMN2 is on the list of allowable PLMNs, or either ignore the request or delete the log at operation 128.

Some embodiments of the present invention may provide a relatively straightforward and simple mechanism by which to manage MDT functionality for mobile terminals that are handed over between cells. Moreover, some embodiments may enable management of MDT functionality with relatively little impact on existing equipment. For example, if PLMN identity can be provided in a request for MDT measurement logged data, the eNB can otherwise remain unchanged and the UE may determine whether or not to respond with the requested information based on the identity of the PLMN. Of note, the example above has been tailored to description of application of an example embodiment to EUTRAN. However, other example embodiments could be practiced in similar fashion with respect to UTRAN or even other networks.

Figure 6:
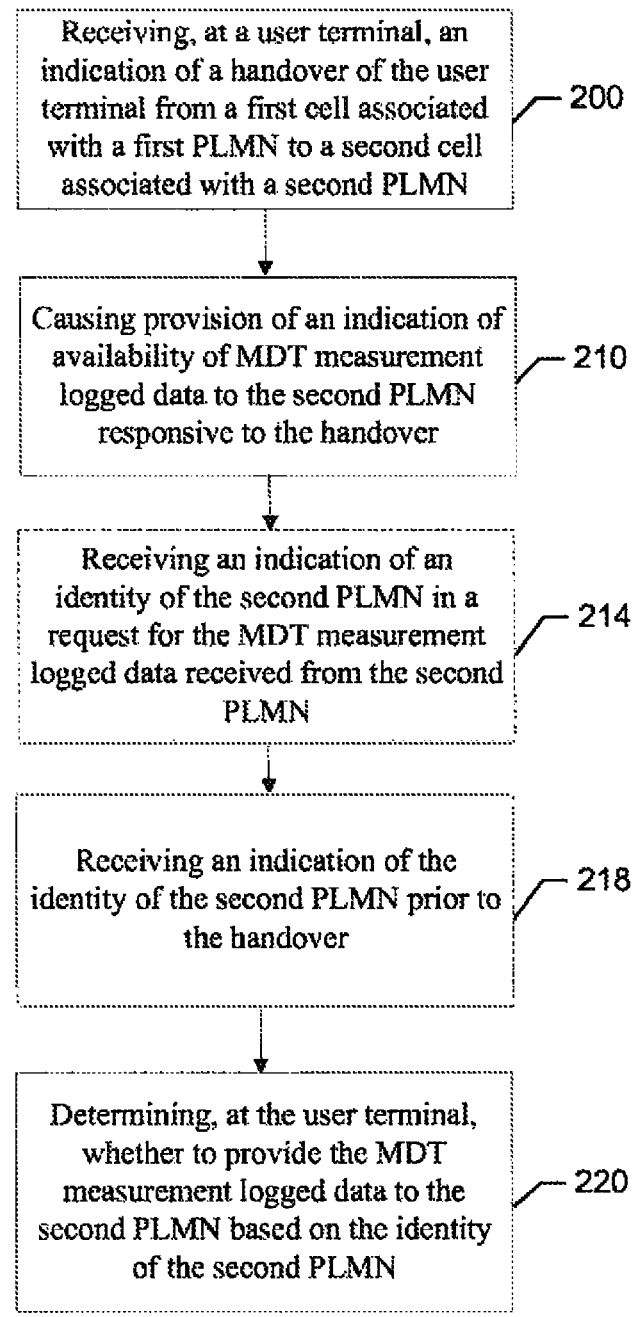
FIG. 6 is a flowchart according to an example method for providing management of measurement reporting according to an example embodiment of the present invention.

FIG. 6 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 6, may include receiving, at a user terminal (e.g., UE 50), an indication of a handover of the user terminal from a first cell associated with a first PLMN to a second cell associated with a second PLMN at operation 200. Responsive to the handover, an indication of availability of MDT measurement logged data may be provided to the second PLMN at operation 210. At operation 220, a determination may be made at the user terminal as to whether to provide the MDT measurement logged data to the second PLMN based on an identity of the second PLMN.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein. In this regard, for example, the method may further include receiving an indication of the identity of the second PLMN in a request for the MDT measurement logged data received from the second PLMN at operation 214. In an alternative embodiment, the method may further include receiving an indication of the identity of the second PLMN prior to the handover at operation 218. In some embodiments, determining whether to provide the MDT measurement logged data may include receiving an instruction from the first PLMN to delete the MDT measurement logged data responsive to the handover. In an example embodiment, determining whether to provide the MDT measurement logged data may include comparing the identity of the second PLMN to a list of allowed PLMNs or to a list of equivalent PLMNs to the first PLMN (or the PLMN that configured the UE for measurement reporting). In some embodiments, determining whether to provide the MDT measurement logged data may include deleting the MDT measurement logged data or not responding to a request for the MDT measurement logged data in response to the second PLMN not being on the list of allowed PLMNs or the list of equivalent PLMNs.

In an example embodiment, an apparatus for performing the method of FIG. 6 above may comprise a processor (e.g., the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the measurement reporting manager 80, and/or a device or circuit for executing instructions or executing an algorithm for processing information as described above. Additionally or alternatively, at least by virtue of the fact that the processor 70 may be configured to control or even be embodied as the measurement reporting manager 80, the processor 70 and/or a device or circuitry for executing instructions or executing an algorithm for processing information as described above may also form example means for performing operations 200-220.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
    receiving an indication of a handover of a user terminal from a first cell associated with a first public land mobile network (PLMN) to a second cell associated with a second PLMN;
    causing an indication of availability of minimization of drive tests (MDT) measurement logged data to be provided in response to the handover; and
    determining, by the user terminal, whether to provide the MDT measurement logged data to the second PLMN based on an identity of the second PLMN, wherein determining whether to provide the MDT measurement logged data comprises failing to respond to a request for the MDT measurement logged data based on the identity of the second PLMN and deleting the MDT measurement logged data based on the identity of the second PLMN.

2. A method according to claim 1 further comprising receiving a request for the MDT measurement logged data from the second PLMN including an indication of the identity of the second PLMN.

3. A method according to claim 1 further comprising receiving an indication of the identity of the second PLMN prior to the handover.

4. A method according to claim 1 wherein determining whether to provide the MDT measurement logged data comprises receiving an instruction from the first PLMN to delete the MDT measurement logged data responsive to the handover.

5. A method according to claim 1 wherein determining whether to provide the MDT measurement logged data comprises comparing the identity of the second PLMN to a plurality of allowed PLMNs.

6. A method according to claims 1 wherein determining whether to provide the MDT measurement logged data comprises comparing the identity of the second PLMN to one or more PLMNs that are equivalent to the first PLMN.

7. A method according to claim 1 wherein determining whether to provide the MDT measurement logged data comprises comparing the identity of the second PLMN to one or more PLMNs that are equivalent to a PLMN that configured the user equipment for measurement reporting.

8. An apparatus comprising at least one processor and at least one memory storing computer program code, wherein the at least one memory and stored computer program code are configured, with the at least one processor, to cause the apparatus to at least:
    receive an indication of a handover of a user terminal from a first cell associated with a first public land mobile network (PLMN) to a second cell associated with a second PLMN;
    cause an indication of availability of minimization of drive tests (MDT) measurement logged data to be provided in response to the handover; and
    determine whether to provide the MDT measurement logged data to the second PLMN based on an identity of the second PLMN, wherein determining whether to provide the MDT measurement logged data comprises failing to respond to a request for the MDT measurement logged data based on the identity of the second PLMN and deleting the MDT measurement logged data based on the identity of the second PLMN.

9. An apparatus according to claim 8 wherein the at least one memory and stored computer program code are further configured, with the at least one processor, to cause the apparatus to receive a request for the MDT measurement logged data from the second PLMN including an indication of the identity of the second PLMN.

10. An apparatus according to claim 8 wherein the at least one memory and stored computer program code are further configured, with the at least one processor, to cause the apparatus to receive an indication of the identity of the second PLMN prior to the handover.

11. An apparatus according to claim 8 wherein the at least one memory and stored computer program code are configured, with the at least one processor, to cause the apparatus to determine whether to provide the MDT measurement logged data by receiving an instruction from the first PLMN to delete the MDT measurement logged data responsive to the handover.

12. An apparatus according to claim 8 wherein the at least one memory and stored computer program code are configured, with the at least one processor, to cause the apparatus to determine whether to provide the MDT measurement logged data by comparing the identity of the second PLMN to a plurality of allowed PLMNs.

13. An apparatus according to claim 8 wherein the at least one memory and stored computer program code are configured, with the at least one processor, to cause the apparatus to determine whether to provide the MDT measurement logged data by comparing the identity of the second PLMN to one or more PLMNs that are equivalent to the first PLMN.

14. An apparatus according to claim 8 wherein the at least one memory and stored computer program code are configured, with the at least one processor, to cause the apparatus to determine whether to provide the MDT measurement logged data by comparing the identity of the second PLMN to one or more PLMNs that are equivalent to a PLMN that configured the user equipment for measurement reporting.

15. An apparatus according to claim 8, wherein the apparatus comprises or is embodied in mobile terminal comprising user interface circuitry and user interface software stored on one or more of the at least one memory; wherein the user interface circuitry and user interface software are configured to:
    facilitate user control of at least some functions of the mobile terminal through use of a display; and
    cause at least a portion of a user interface of the mobile terminal to be displayed on the display to facilitate user control of at least some functions of the mobile terminal.

16. A computer program product comprising at least one non-transitory computer-readable storage medium having computer-readable program instructions stored therein, the computer-readable program instructions comprising:
    program instructions configured to receive an indication of a handover of a user terminal from a first cell associated with a first public land mobile network (PLMN) to a second cell associated with a second PLMN;
    program instructions configured to cause an indication of availability of minimization of drive tests (MDT) measurement logged data to be provided in response to the handover; and
    program instructions configured to determine whether to provide the MDT measurement logged data to the second PLMN based on an identity of the second PLMN, wherein determining whether to provide the MDT measurement logged data comprises failing to respond to a request for the MDT measurement logged data based on the identity of the second PLMN and deleting the MDT measurement logged data based on the identity of the second PLMN.

* * * * *